United States Patent [19]

Kato

[11] Patent Number: 5,161,467
[45] Date of Patent: Nov. 10, 1992

[54] INDUSTRIAL ROBOT SYSTEM
[75] Inventor: Hisao Kato, Aichi, Japan
[73] Assignee: Mitsubishi Denki K.K., Tokyo, Japan
[21] Appl. No.: 342,593
[22] Filed: Apr. 20, 1989

Related U.S. Application Data
[63] Continuation of Ser. No. 116,308, Nov. 4, 1987, abandoned.

[30] Foreign Application Priority Data
Nov. 5, 1986 [JP] Japan .................. 61-261981

[51] Int. Cl.⁵ .................. B60L 15/00; G05D 1/08
[52] U.S. Cl. .................. 104/300; 246/182 B
[58] Field of Search ................. 104/295, 300; 246/182 R, 182 B, 192 A, 193, 194; 901/1

[56] References Cited

U.S. PATENT DOCUMENTS

| | | | |
|---|---|---|---|
| 3,128,070 | 4/1964 | Harris, Jr. et al. | 246/187 B |
| 3,646,890 | 3/1972 | Snyder | 104/307 |
| 3,718,097 | 2/1973 | Tourneau et al. | 104/295 X |
| 3,815,084 | 6/1974 | Pease | 340/988 |
| 4,196,471 | 4/1980 | McClure | 246/187 B X |
| 4,207,821 | 6/1980 | Beckert | 105/29.1 X |
| 4,641,251 | 2/1987 | Inoue | 901/1 |
| 4,658,385 | 4/1987 | Tsuji | 901/1 |
| 4,664,590 | 5/1987 | Maekawa | 901/1 |
| 4,669,390 | 6/1987 | Bisiach | 901/1 |
| 4,698,775 | 10/1987 | Koch et al. | 901/1 |
| 4,813,125 | 3/1989 | Dacey, Jr. | 29/714 |
| 4,815,190 | 3/1989 | Haba, Jr. et al. | 29/701 |
| 4,998,206 | 3/1991 | Jones et al. | 364/468 |

FOREIGN PATENT DOCUMENTS

| | | | |
|---|---|---|---|
| 0152014 | 9/1982 | Japan | 318/587 |
| 0081610 | 5/1985 | Japan | 318/587 |

Primary Examiner—Joseph F. Peters, Jr.
Assistant Examiner—Virna Lissi Mojica
Attorney, Agent, or Firm—Sughrue, Mion, Zinn, Macpeak & Seas

[57] ABSTRACT

An industrial robot system comprises a robot movable on a track formed on a floor; work stations arranged along the track, where the robot deals with workpieces in a predetermined order; reference points provided at the stations, respectively, and a detector installed on the robot for detecting the reference points so that the robot can be properly positioned with respect to each work station.

8 Claims, 2 Drawing Sheets

INDUSTRIAL ROBOT SYSTEM

This is a continuation of application Ser. No. 07/116,308 filed Nov. 4, 1987, now abandoned.

BACKGROUND OF THE INVENTION

1. Field of the Invention

This invention relates to an industrial robot system in which a robot deals with workpieces at a plurality of work stations in a predetermined order, and more particularly to an industrial robot system in which a robot which moves on rails can be accurately positioned at selected work station.

2. Prior Art

In a conventional industrial robot system of this type, a robot is moved on rails installed on a drive path which is formed on a concrete floor, and a rack secured to the drive path is engaged with a pinion of the robot. In the system, this robot is controlled according to the number of revolutions of the pinion which is turned as the robot travels, so that the robot is positioned in place at the work stations installed on the concrete floor, to handle workpieces at the work stations, e.g., to machine or assemble them.

In the conventional industrial robot system, the number of revolutions of the pinion of the robot, corresponding to the distances between a reference point on the traveling stand and a predetermined point at each of the work stations have been stored in a control unit in advance, so that the robot is moved, under control, to positions at the work stations in a predetermined order. However, the conventional industrial robot system suffers from a difficulty in that, since the concrete floor on which the work stations are provided is different in linear expansion coefficient from the rack engaged with the pinion of the robot, variations in the ambient temperature lower the accuracy in positioning the robot in place at the work stations.

SUMMARY OF THE INVENTION

An object of this invention is to provide an industrial robot system which eliminates the above-described difficulty accompanying the conventional industrial robot system.

Another object of the invention is to provide an industrial robot system in which the robot can be accurately positioned at the work stations without being affected by variations in the ambient temperature.

The foregoing object and other objects of the invention have been achieved by the provision of an industrial robot system comprising: a robot movable on a drive path formed on a floor; and a plurality of work stations provided along the drive path, such that the robot can handle the workpieces at the work stations in a predetermined order in response to instructions from a control unit, which, according to the invention, further includes: predetermined points provided at the work stations, respectively; and detecting means provided for the robot, for detecting the predetermined points at the work stations.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 5 is a plan view of an industrial robot system according to a second embodiment of the invention.

DETAILED DESCRIPTION OF THE PREFERRED EMBODIMENT

Figure 1:
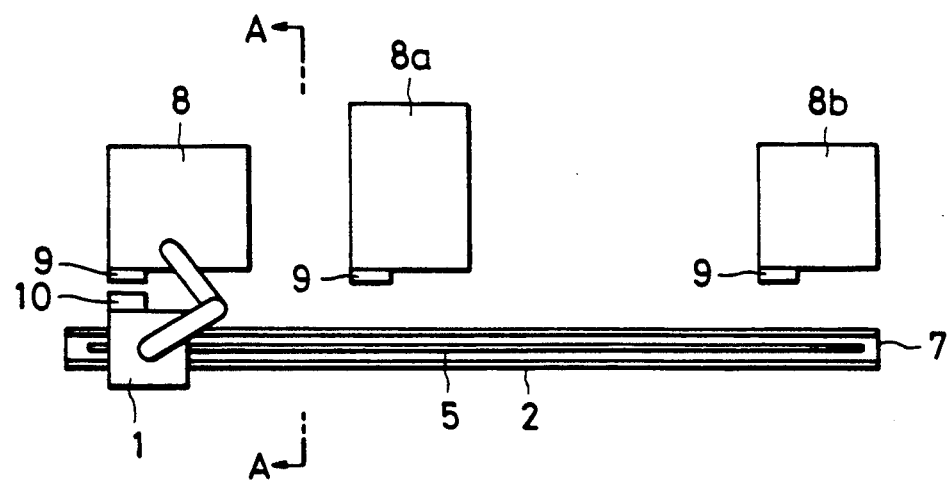
FIG. 1 is a plan view showing the arrangement of an industrial robot system according to an embodiment of the present invention.

Referring to the drawings, an embodiment according to the present invention will be described in detail.

Figure 2:
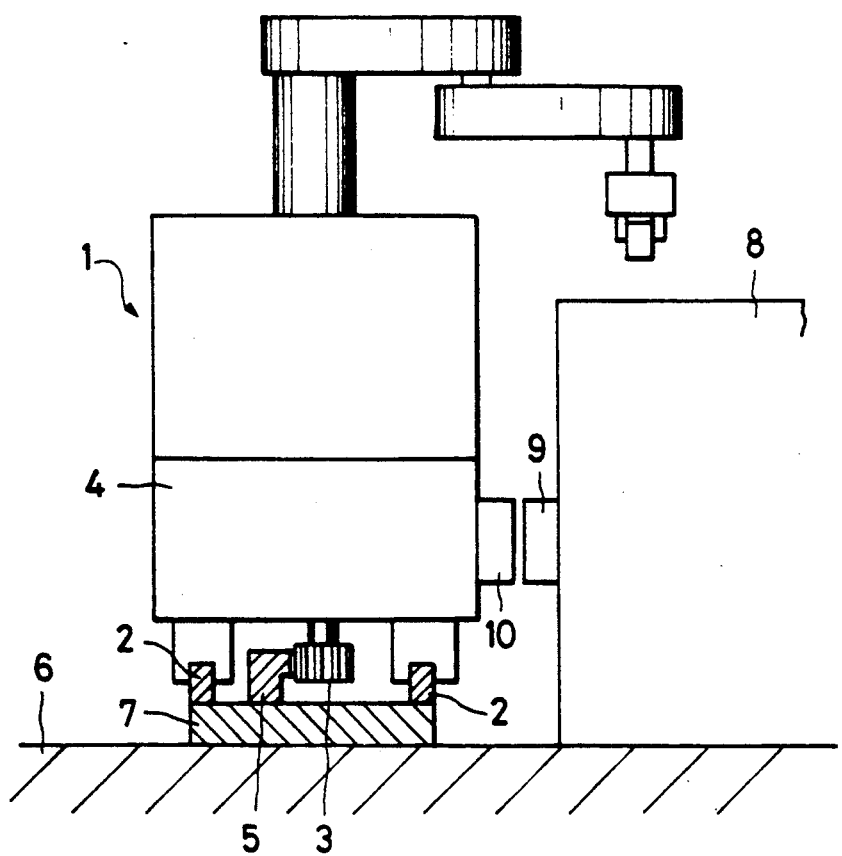
FIG. 2 is a sectional view taken along line A—A in FIG. 1.
Figure 4:
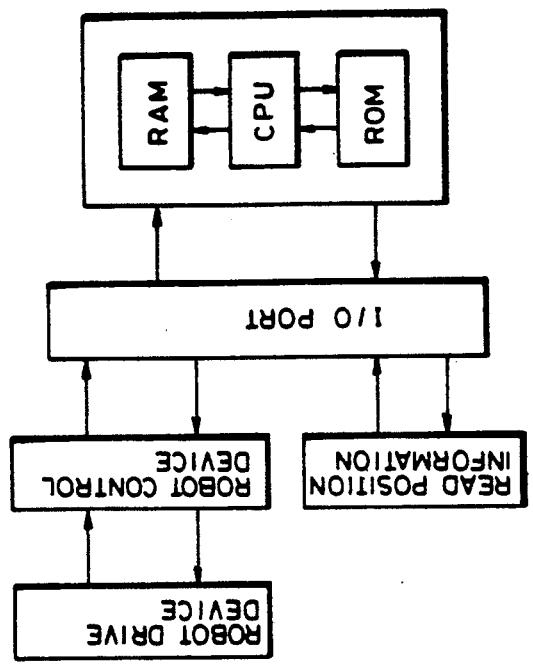
FIG. 4 is a block diagram describing the operation of controlling the robot which has been positioned at a selected work station.

In FIGS. 1 and 2, a robot 1 is moved on rails 2, and a pinion 3 is coupled to the drive unit of the robot 4 which operates in response to instructions from a control unit device 15 (FIG. 4). A rack 5 is secured to a drive path 7 installed on a floor 6, in such a manner that the rack 5 is engaged with the pinion 3. Each of the work stations 8, 8a and 8b is provided with a reference label 9 which indicates a predetermined point at each work station. A detector 10 is provided on the robot 1 for detecting the predetermined point at the work station. The detector 10 is, for example, made up of an electronic flash lamp and a camera.

Figure 3:
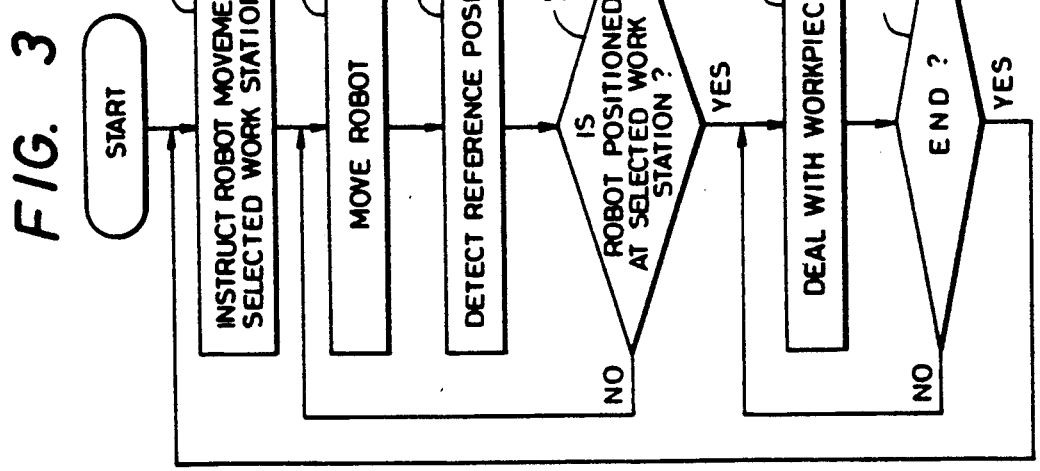
FIG. 3 is a flow chart describing the operation of the industrial robot system according to the invention.

The industrial robot system thus constructed operates as follows: When the control device issues an instruction to move the robot 1 to a selected work station (8 for instance) as shown in the flow chart of FIG. 3 (S101), the drive unit 4 operates to rotate the pinion 3 to thereby move the robot 1 (S102). When the robot 1 has been moved to the selected work station 8, the predetermined point on the reference label 9 is detected by the detector 10 (S103), whereby it is determined whether or not the robot 1 is accurately positioned in place at the work station 8 (S104). When it is determined that the position of the robot 1 relative to the work station 8 is within a predetermined allowable range, the robot 1 is allowed to start its operation at the work station 8 (S105).

As shown in FIG. 4, read position information obtained from the detector 10 is sent from read position information unit 110 to control unit 12 for comparison with stored information indicative of the predetermined point, e.g., from ROM 12a. If the robot 1 is not correctly positioned at the work station 8, a signal corresponding to the positional deviation of the robot 1 from the predetermined point is generated by the control unit 12 and fed back to a robot control device. In response to the signal, the control unit outputs a signal to actuate a robot drive device 41 of the drive unit 4 thereby to move the robot 1 forwardly or backwardly so that, at the work station 8, the position of the robot 1 will fall within the predetermined allowable range.

The operation of control of the robot at the start (S105) will be described in more detail. As shown in the block diagram of FIG. 4, in response to read-out position data which indicate that the position of the robot 1 relative to the work station 8 is within the predetermined allowable range, work data regarding the work to be carried out at the work station 8 are read through an I/O port 13 out of memory means. In response to the work data thus read out, a robot control device issues instructions to cause the robot 1 to handle the workpiece as required.

When it is determined that the work at the work station 8 has been done by the robot (S106), in response to an instruction from the control unit the robot 1 is moved on the rail 2 to the next work station (8a for instance) to perform operations thereat. In this manner, the robot 1 is moved to a predetermined number of work stations (8, 8a, 8b . . . ) successively to deal with the workpieces provided thereat.

In the above-described embodiment, the detector 10 for detecting the predetermined points at the work stations 8, 8a, 8b and so on is an optical means made up of an electronic flash lamp and a camera. However, as in FIG. 5, in which items with reference numerals matching those of FIG. 1 are the same, magnetic means made up of a magnetic card 9 and a magnetic detector 10 may be employed to detect the predetermined points. Alternatively, mechanical means may be employed in which protrusions are provided at the work stations, and a contact sensor provided on the robot cooperates to detect the predetermined points at work stations.

As described above, in the industrial robot system according to the invention, the predetermined points are provided at the work stations where the robot handles the workpieces, and the means for detecting the predetermined points is provided for the robot, so that, after the detecting means determines that the position of the robot relative to a selected one of the work stations is within a predetermined allowable range, the robot is able to handle the workpiece. Therefore, the robot can be accurately positioned without being affected by variations in the ambient temperature.

What is claimed is:

1. An industrial robot system comprising:
   a drive path fixedly mounted on a floor;
   a robot movable along said drive path;
   a plurality of work stations fixed on said floor adjacent said drive path;
   reference means provided at each of said plurality of work stations;
   detecting means provided on said robot for detecting said reference means;
   control means for controlling the movement of said robot along said drive path such that said robot is sequentially positioned opposite a plurality of work stations and for stopping the movement of said robot along said drive path at a work station when said detecting means detects said reference means within a predetermined allowable range, and for controlling the operation of said robot at each station such that said robot then handles workpieces provided at the work station associated with the detected reference means; and
   said control means being operative to control the movement of said robot such that the position of said robot relative to one of said plurality of work stations comes within said predetermined allowable range, and if said position is outside of said range a positional deviation signal is produced and fed back to said control means thereby actuating the control unit and moving the robot to within said range.

2. An industrial robot system as claimed in claim 1, further comprising a rail provided on said drive path on which said robot moves.

3. An industrial robot system as claimed in claim 2, further comprising a rack secured to said drive path and a pinion provided on said robot, in which said rack is engaged with said pinion to move said robot.

4. An industrial robot system as claimed in claim 3, further comprising a drive unit to which said pinion is coupled.

5. An industrial robot system as claimed in claim 1, in which said reference means and said detecting means comprise an optical device.

6. An industrial robot system as claimed in claim 5, in which said optical device comprises an electronic flash lamp and a camera.

7. An industrial robot system as claimed in claim 1, in which said reference means and said detecting means comprise a magnetic device.

8. An industrial robot system as claimed in claim 6, in which said magnetic device comprises a magnetic detector and a magnetic card.

* * * * *